(12) United States Patent
Ishii

(10) Patent No.: US 7,872,458 B2
(45) Date of Patent: Jan. 18, 2011

(54) DC-TO-DC CONVERTER

(75) Inventor: Takuya Ishii, Osaka (JP)

(73) Assignee: Panasonic Corporation, Osaka (JP)

( * ) Notice: Subject to any disclaimer, the term of this patent is extended or adjusted under 35 U.S.C. 154(b) by 85 days.

(21) Appl. No.: 12/332,081

(22) Filed: Dec. 10, 2008

(65) Prior Publication Data

US 2009/0153124 A1    Jun. 18, 2009

(30) Foreign Application Priority Data

Dec. 17, 2007    (JP) ............................. 2007-324622

(51) Int. Cl.
*G05F 1/00* (2006.01)
(52) U.S. Cl. ...................................... 323/271; 323/282
(58) Field of Classification Search ................. 323/290, 323/222, 232, 271, 282, 283, 284, 285
See application file for complete search history.

(56) References Cited

U.S. PATENT DOCUMENTS

| 5,481,178 | A | 1/1996 | Wilcox et al. | |
|---|---|---|---|---|
| 6,621,256 | B2 | 9/2003 | Muratov et al. | |
| 6,815,939 | B2 | 11/2004 | Umemoto et al. | |
| 7,304,464 | B2 * | 12/2007 | Weng et al. ................ | 323/285 |
| 2002/0185994 | A1 * | 12/2002 | Kanouda et al. ............ | 323/282 |
| 2006/0145678 | A1 * | 7/2006 | Ribeiro et al. .............. | 323/299 |
| 2007/0216372 | A1 * | 9/2007 | Weng et al. ................. | 323/222 |

FOREIGN PATENT DOCUMENTS

| JP | 64-039265 | 2/1989 |
|---|---|---|
| JP | 6-303766 | 10/1994 |
| JP | 08-289542 | 11/1996 |
| JP | 10-248238 | 9/1998 |

* cited by examiner

*Primary Examiner*—Bao Q Vu
*Assistant Examiner*—Nguyen Tran
(74) *Attorney, Agent, or Firm*—McDermott Will & Emery LLP

(57) ABSTRACT

A DC-to-DC converter includes a DC-to-DC conversion unit for converting an input voltage into an output voltage by switching operation of the switching element according to a drive signal and supplying the output voltage to a load and a control unit for generating the drive signal. The control unit includes a determination circuit for determining whether the load is in a normal operation state or a standby state, an error amplifier for generating an error signal according to the output voltage, a first drive-signal generator for generating a pulse sequence of pulses each having a pulse width according to the error signal, and a second drive-signal generator for generating a pulse having a pulse width larger than a cycle of repetition of the pulses in the pulse sequence when the voltage according to the output voltage falls below the reference voltage and the load is in the standby state.

6 Claims, 7 Drawing Sheets

DC-TO-DC CONVERTER

CROSS-REFERENCE TO RELATED APPLICATION

This application claims priority under 35 U.S.C. §119 on Patent Application No. 2007-324622 filed in Japan on Dec. 17, 2007, the entire contents of which are hereby incorporated by reference.

BACKGROUND

The present disclosure relates to switching DC-to-DC converters.

Recent switching DC-to-DC converters exhibit highly-efficient power conversion characteristics and, therefore, are used as power supply circuits for electronic equipment in many cases. In particular, for such power supply circuits used for mobile equipment typified by cellular phones, it is necessary to reduce current consumption in a light-load state, e.g., a non-operating mode or a standby mode, in order to make batteries as power sources usable for a long period of time.

An example of such a DC-to-DC converter is disclosed in Japanese Laid-Open Patent Publication No. 10-248238. When a load driven by this DC-to-DC converter is stopped or suspended, the DC-to-DC converter increases the external resistance of an oscillator to reduce the frequency of a generated pulse signal, thereby extending the switching period. In the DC-to-DC converter, since switching losses proportional to the number of switching operations are dominant, such reduction of the switching frequency in a light-load mode minimizes power losses.

Japanese Laid-Open Patent Publication Nos. 64-39265 and 6-303766 disclose a method for minimizing losses by causing the DC-to-DC converter to perform burst operation, i.e., to alternatively perform operation and suspension and, thereby also suppressing current consumption in a control circuit in a long suspension period in a light-load mode.

However, in the DC-to-DC converter disclosed in Japanese Laid-Open Patent Publication No. 10-248238, control of an output voltage itself is unchanged from that in a normal operation, and the switching frequency is reduced by switching a constant of an oscillator. Since it is difficult to reduce the switching frequency to a few tenths or hundredths of that in normal operation, the above-mentioned method is not as good as the burst operation in terms of loss reduction. However, the burst operation has a drawback in which repetition of an operation period of high-frequency switching causes burst noise.

SUMMARY

The example DC-to-DC converter may be advantageous in minimizing power losses in a light-load mode without occurrence of burst noise.

A DC-to-DC converter according to an embodiment of the present invention includes: a DC-to-DC conversion unit that has an inductor and a switching element connected to the inductor and is configured to convert an input voltage into an output voltage by switching operation of the switching element according to a drive signal and to supply the output voltage to a load; and a control unit for generating the drive signal. The control unit includes: a determination circuit for determining whether the load is in a normal operation state or a standby state based on one of a current flowing in the DC-to-DC converter and the output voltage and for generating a mode signal indicating a result of the determination; an error amplifier for generating an error signal according to an error between a voltage according to the output voltage and a reference voltage; a first drive-signal generator for generating a pulse sequence of pulses each having a pulse width according to the error signal and outputting the pulse sequence as the drive signal when the mode signal indicates that the load is in the normal operation state; and a second drive-signal generator for generating a pulse having a pulse width larger than a cycle of repetition of the pulses in the pulse sequence and outputting the generated pulse as the drive signal when the voltage according to the output voltage falls below the reference voltage in a situation where the mode signal indicates that the load is in the standby state.

In this converter, when the mode signal indicates that the load is in the standby state, a pulse having a pulse width larger than a cycle of pulses in a pulse sequence generated when the load is in the normal operation state is output as a drive signal. Accordingly, the switching frequency in the DC-to-DC conversion unit may be greatly reduced, thus allowing minimization of power losses in a light-load mode.

According to an embodiment of the present invention, the number of switching operations is greatly reduced. Thus, power losses of a DC-to-DC converter in a light-load mode may be minimized without occurrence of burst noise.

DETAILED DESCRIPTION OF THE INVENTION

Hereinafter, embodiments of the present invention will be described with reference to the drawings.

Embodiment 1

Figure 1:
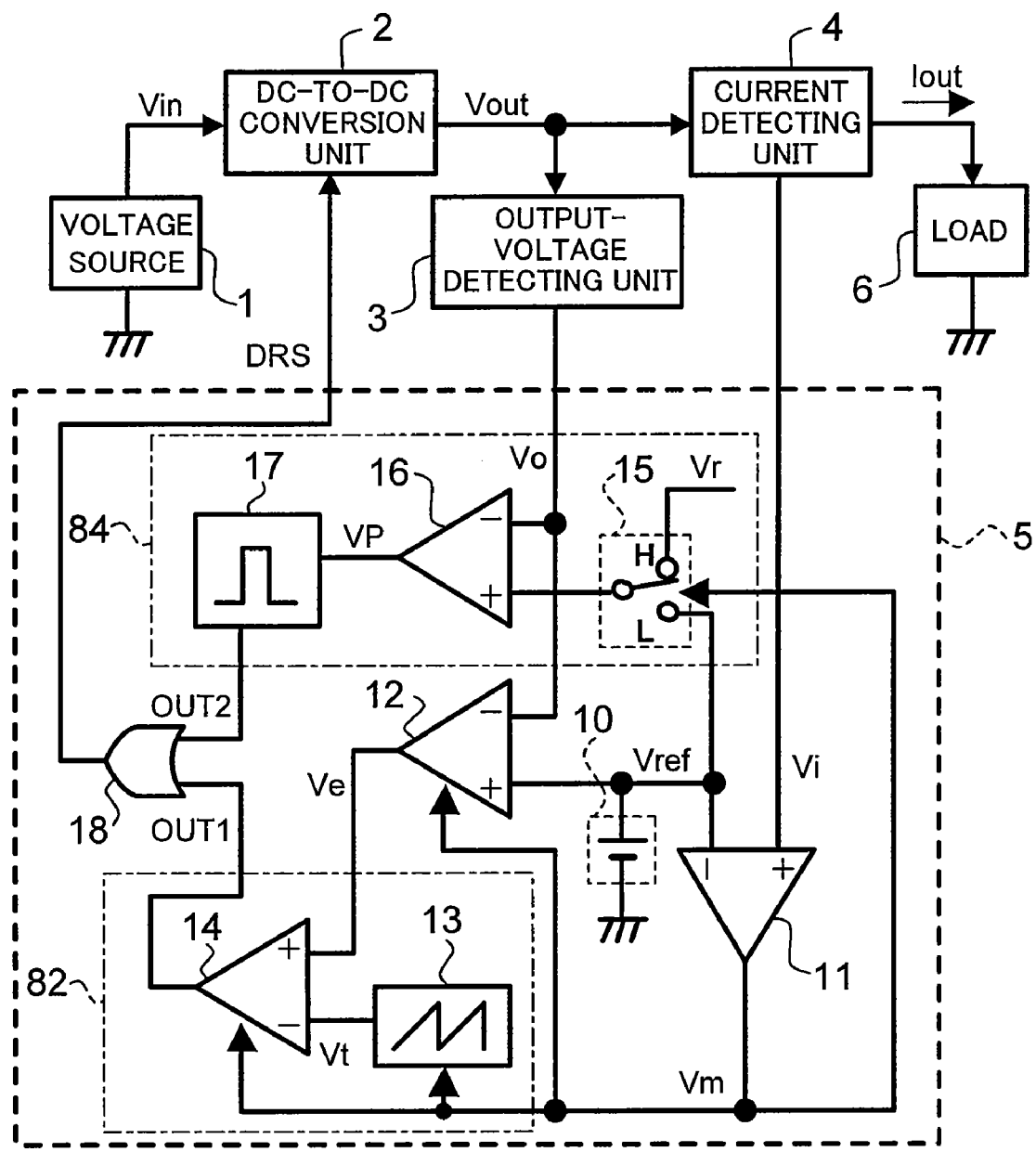
FIG. 1 is a block diagram showing a configuration of a DC-to-DC converter according to a first embodiment of the present invention.

FIG. 1 is a block diagram showing a configuration of a DC-to-DC converter according to a first embodiment of the present invention. The DC-to-DC converter shown in FIG. 1 includes: a DC-to-DC conversion unit 2; an output-voltage detecting unit 3; a current detecting unit 4; and a control unit 5.

The DC-to-DC conversion unit 2 is a switching converter and receives a DC input voltage Vin from a voltage source 1 such as a battery. The DC-to-DC conversion unit 2 performs switching according to a drive signal DRS, thereby converting the input voltage Vin into a DC output voltage Vout and outputting the DC output voltage Vout.

The output-voltage detecting unit 3 generates and outputs a voltage detection signal Vo having a voltage according to the output voltage Vout. The current detecting unit 4 generates and outputs a current detection signal Vi having a voltage according to an output current Iout supplied from the DC-to-DC conversion unit 2 to a load 6. Based on the voltage detection signal Vo and the current detection signal Vi, the control unit 5 generates the drive signal DRS in such a manner that the output voltage Vout is constant.

The control unit 5 includes: a reference voltage source 10; a comparator 11 serving as a determination circuit; an error amplifier 12; an OR circuit 18; a drive signal generator 82 associated with a normal operation mode; and a drive signal generator 84 associated with a standby mode. The drive signal generator 82 includes a triangular wave generator 13 and a PWM comparator 14. The drive signal generator 84 includes a switch circuit 15, a comparator 16, and a one-shot pulse generator 17.

The reference voltage source 10 includes a bandgap circuit, for example, and generates a reference voltage Vref. The comparator 11 compares the current detection signal Vi output from the current detecting unit 4 with the reference voltage Vref, determines whether the load 6 is in the normal operation state or the standby state, and generates and outputs a mode signal Vm indicating a result of the determination.

When the load 6 performs normal operation, i.e., is in the normal operation state, a relatively large amount of output current Iout is supplied to the load 6. In view of this, when the current detection signal Vi is equal to or higher than the reference voltage Vref, the comparator 11 determines that the output current Iout has a value equal to or larger than a given value and the load 6 is in the normal operation state, thereby setting the mode signal Vm at a high potential ("H"). At this time, the DC-to-DC converter shown in FIG. 1 operates in a normal operation mode. On the other hand, when the load 6 is in the standby state (i.e., the load 6 is stopped or suspended), a relatively small amount of output current Iout is supplied to the load 6. In view of this, when the current detection signal Vi is lower than the reference voltage Vref, the comparator 11 determines that the output current Iout has a value smaller than the given value and the load 6 is in the standby state, thereby setting the mode signal Vm at a low potential ("L"). At this time, the DC-to-DC converter shown in FIG. 1 operates in a standby mode.

The error amplifier 12 amplifies an error between the voltage detection signal Vo from the output-voltage detecting unit 3 and the reference voltage Vref and outputs the result as an error signal Ve. The error signal Ve decreases with an increase of the voltage detection signal Vo, while increasing with a decrease of the voltage detection signal Vo. The error amplifier 12 is activated and operates when the mode signal Vm is at "H", and stops its operation when the mode signal Vm is at "L".

The triangular wave generator 13 outputs a triangular wave signal Vt including a triangular wave periodically rising and falling at given frequencies. The triangular wave generator 13 is activated and outputs a triangular wave when the mode signal Vm is at "H", while stopping its operation and keeping the output at "H" when the mode signal Vm is at "L". The PWM comparator 14 compares the error signal Ve with the triangular wave signal Vt, and outputs a drive signal OUT1 which is at "H" when the error signal Ve is higher than the triangular wave signal Vt and is at "L" when the error signal Ve is equal to or lower than the triangular wave signal Vt. Thus, the PWM comparator 14 outputs a pulse sequence in which the pulse repetition cycle is almost equal to the cycle of the triangular wave signal Vt. Alternatively, the PWM comparator 14 may be activated and operate when the mode signal Vm is at "H" and may stop and keep the output at "L" when the mode signal Vm is at "L".

The switch circuit 15 selects and outputs a voltage Vr when the mode signal Vm output from the comparator 11 is at "H", while selecting and outputting the reference voltage Vref when the mode signal Vm is at "L". The voltage Vr is a DC voltage at a level lower than the reference voltage Vref, and is generated by dividing the reference voltage Vref using, for example, resistors. The comparator 16 compares the voltage detection signal Vo with the output of the switch circuit 15, and outputs "H" when the voltage detection signal Vo is equal to or lower than the output of the switch circuit 15, and otherwise "L", as an output signal VP.

The one-shot pulse generator 17 outputs a one-shot pulse having a given pulse width Ton as a drive signal OUT2 in synchronization with rising of the output signal VP of the comparator 16 from "L" to "H". This pulse width Ton is larger than the cycle of triangular wave signal Vt (i.e., the cycle of repetition of output pulses from the PWM comparator 14) and is set at, for example, several times as large as the cycle of the triangular wave signal Vt. The OR circuit 18 outputs a logical sum of the drive signals OUT1 and OUT2 as the drive signal DRS to the DC-to-DC conversion unit 2.

Figure 2:
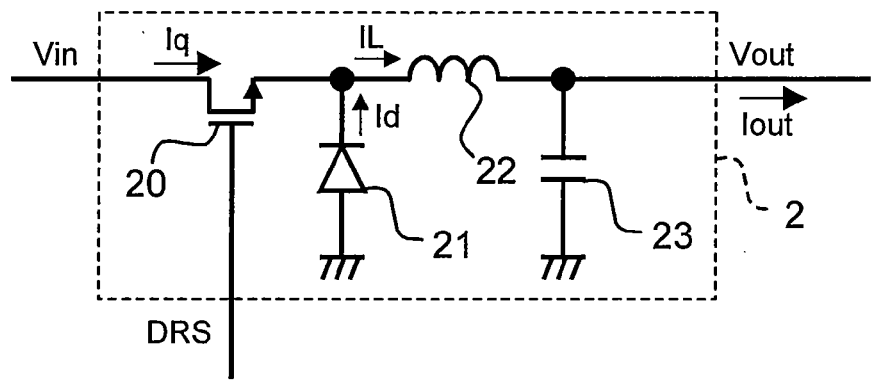
FIG. 2 is a circuit diagram showing a configuration of a DC-to-DC conversion unit shown in FIG. 1.

FIG. 2 is a circuit diagram showing a configuration of the DC-to-DC conversion unit 2 shown in FIG. 1. The DC-to-DC conversion unit 2 is a buck converter and includes: a switching element 20; a diode 21; an inductor 22; and an output capacitor 23. The inductor 22 has an inductance L. The output capacitor 23 has a capacitance C. The switching element 20 is a switching transistor such as a metal oxide semiconductor field-effect transistor (MOSFET) and performs switching according to the drive signal DRS.

The switching operation of the switching element 20 causes repetitive charge and discharge of electromagnetic energy to/from the inductor 22 so that a current fluctuating in the form of a triangular wave flows in the inductor 22. The output capacitor 23 smoothes this current and outputs the resultant current. The output voltage Vout is adjusted using a ratio between ON and OFF periods of the switching element 20 performing switching operation.

In the standby mode, a one-shot triangular current having a peak value of $(Vin-Vout) \times Ton/L$ flows in the inductor 22 for a period of $(Vin/Vout) \times Ton$. Suppose the switching operation is repeated in a cycle T, the cycle T is expressed as:

$$T = Vin \cdot (Vin - Vout) \cdot Ton^2 / (2L \cdot Vout \cdot Iout)$$

The variation amount $\Delta Vout$ of the output voltage Vout increases as the output current Iout decreases. When Iout=0, the amount $\Delta Vout$ is expressed as:

$$\Delta Vout = Vin \cdot (Vin - Vout) \cdot Ton^2 / (2L \cdot Vout \cdot C)$$

These equations change depending on the type of the converter. However, independently of the type of the converter, the tendency in which as the pulse width Ton of the one-shot pulse increases the cycle T increases so that the non-operation period of the DC-to-DC conversion unit 2 increases to minimize losses and the output voltage variation amount $\Delta Vout$ also increases, is unchanged. The pulse width Ton of the one-shot pulse is set in consideration of the current capacity of the switching element, the cycle T, and the output voltage variation amount $\Delta Vout$, for example.

Figure 3:
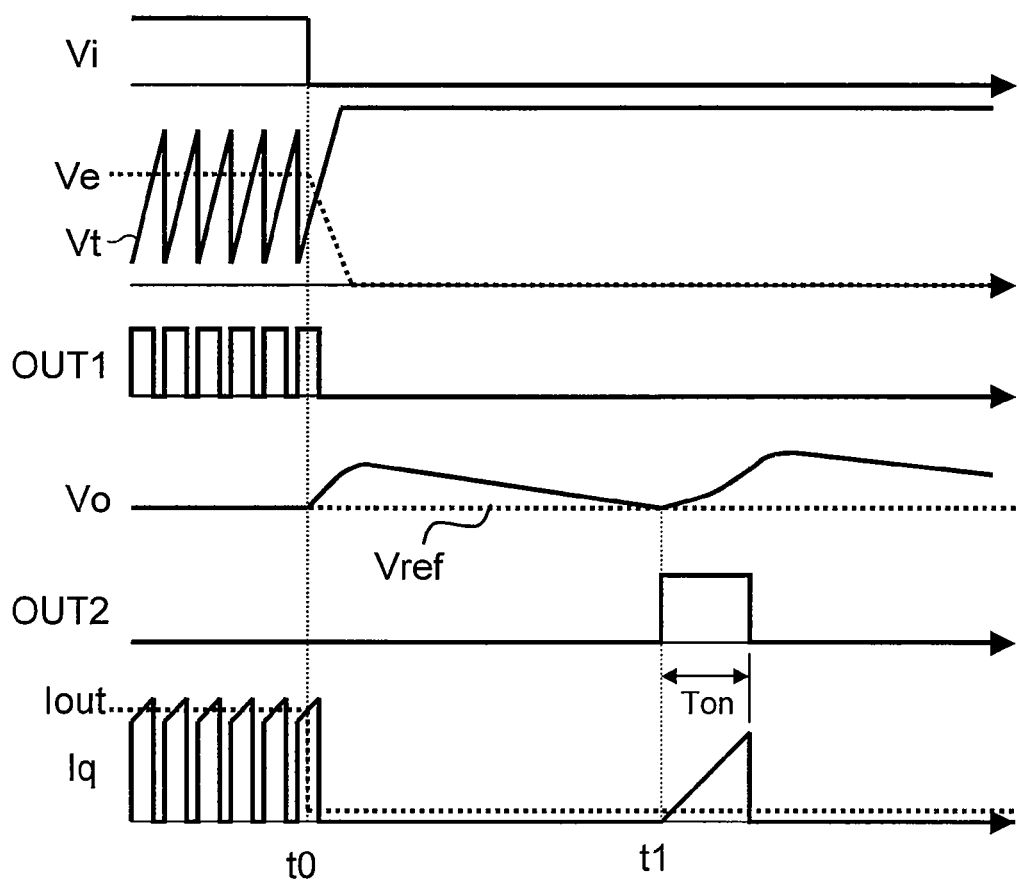
FIG. 3 is a graph showing signal waveforms in the DC-to-DC converter shown in FIG. 1.

FIG. 3 is a graph showing signal waveforms in the DC-to-DC converter shown in FIG. 1. Referring now to FIGS. 1 through 3, it will be described how the DC-to-DC converter shown in FIG. 1 operates.

First, operation of the DC-to-DC converter in a normal operation mode in which the output current Iout is equal to or larger than a given value. Before time t0 in FIG. 3, the current detection signal Vi is equal to or higher than the reference voltage Vref. Since the mode signal Vm is at "H", the error amplifier 12 and the triangular wave generator 13 operate, and the switch circuit 15 selects the voltage Vr to output the selected voltage Vr to a positive input terminal of the comparator 16.

The error amplifier 12 outputs the error signal Ve according to an error between the voltage detection signal Vo and the reference voltage Vref. The PWM comparator 14 compares the error signal Ve with the triangular wave signal Vt and outputs the result as the drive signal OUT1. For example, when the voltage detection signal Vo increases, the level of the error signal Ve decreases so that the drive signal OUT1 has a narrower pulse width.

Since the low voltage Vr (which may be, for example, 0 V in this case) is applied to the positive input terminal of the comparator 16, the output signal VP from the comparator 16 is fixed at "L". Accordingly, the one-shot pulse generator 17 fixes the drive signal OUT2 at "L". Thus, the drive signal OUT1 is supplied to the DC-to-DC conversion unit 2 as the drive signal DRS and feedback control is performed in such a manner that the voltage detection signal Vo becomes equal to the reference voltage Vref.

Next, operation when the load 6 is stopped or suspended, i.e., is in a standby state at time t0 is described. In this case, the output current Iout decreases so that the current detection signal Vi decreases and the comparator 11 sets the mode signal Vm at "L". Accordingly, the DC-to-DC converter operates in a standby mode.

At this time, the error amplifier 12 stops to set the error signal Ve at a low level, and the triangular wave generator 13 stops to set the triangular wave signal Vt is at "H". Accordingly, the drive signal OUT1 output from the PWM comparator 14 is fixed at "L". In period after the output current Iout has decreased and before the drive signal OUT1 is fixed at "L", the output voltage Vout and the voltage detection signal Vo increase and the voltage detection signal Vo exceeds the reference voltage Vref.

The switch circuit 15 selects the reference voltage Vref and outputs the selected reference voltage Vref to the positive input terminal of the comparator 16. Since the voltage detection signal Vo is higher than the reference voltage Vref, the comparator 16 outputs "L" as the output signal VP. The drive signal OUT2 remains at "L" and the DC-to-DC conversion unit 2 stops switching operation so that no power is supplied from the DC-to-DC conversion unit 2 and the output voltage Vout gradually decreases.

At time t1, when the voltage detection signal Vo falls below the reference voltage Vref, the comparator 16 increases the output signal VP from "L" to "H". Then, the one-shot pulse generator 17 outputs a one-shot pulse with a pulse width Ton as a drive signal OUT2. Since this pulse width Ton is set about several times as large as the cycle of the triangular wave signal Vt, the switching element 20 is ON in a period longer than that in the normal operation mode in the DC-to-DC conversion unit 2. Accordingly, power supplied from the DC-to-DC conversion unit 2 to the load 6 temporarily increases so that the output voltage Vout increases, and the voltage detection signal Vo exceeds the reference voltage Vref.

Then, the comparator 16 sets the output signal VP at "L". This state continues until the output voltage Vout decreases and the voltage detection signal Vo falls below the reference voltage Vref again. When the voltage detection signal Vo falls below the reference voltage Vref, the comparator 16 increases the output signal VP from "L" to "H" again and the one-shot pulse with a pulse width Ton output from the one-shot pulse generator 17 causes the DC-to-DC conversion unit 2 to temporarily operate. The foregoing operation is repeated, thereby maintaining the output voltage Vout in such a manner that the voltage detection signal Vo is equal to or higher than the reference voltage Vref.

As described above, in the standby mode with a light load, the ON period of the switching element 20 in the DC-to-DC conversion unit 2 is set several times as long as the switching cycle in the normal operation mode and, in addition, switching is suspended until the increased voltage detection signal Vo decreases to the reference voltage Vref. Thus, the switching frequency of the DC-to-DC converter becomes extremely low. Accordingly, it is possible to minimize power losses in the light-load mode in which switching losses are dominant. In addition, in the standby mode, switching operation is performed only once in every considerably-long period, resulting in causing no burst noise.

In a case where the current detection signal Vi according to the output current Iout is not stabilized around the reference voltage Vref, a hysteresis comparator may be used as the comparator 11 in order to avoid unstable operation alternating between the normal operation mode and the standby mode.

In the foregoing description, the current detecting unit 4 detects the output current Iout and outputs the current detection signal Vi. Alternatively, the current detecting unit 4 may detect a switching element current Iq, an inductor current IL, or a rectifier current Id, for example, (see FIG. 2) and output a current detection signal Vi according to the detected current and an average value thereof in terms of time.

Embodiment 2

Figure 4:
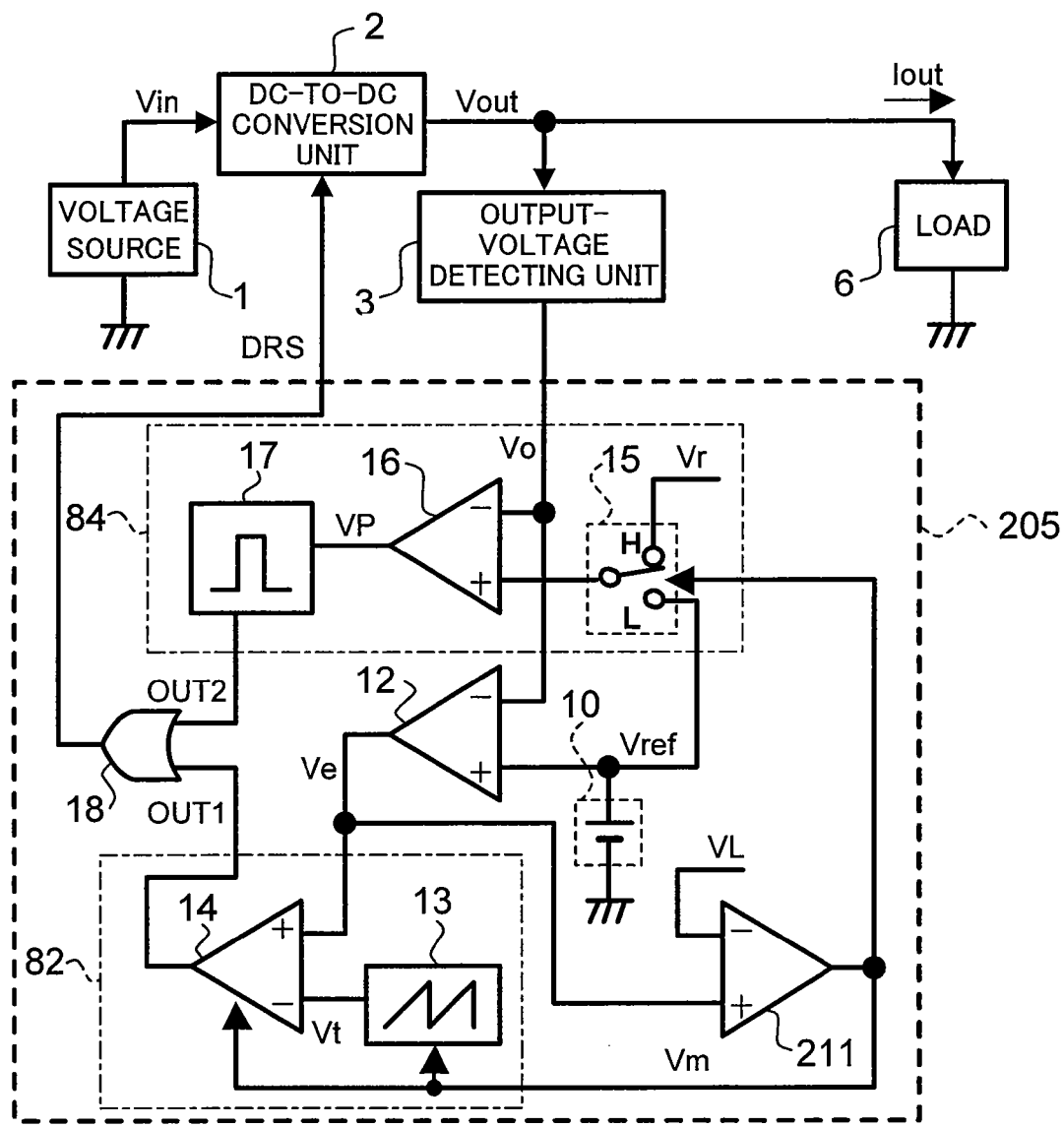
FIG. 4 is a block diagram showing a configuration of a DC-to-DC converter according to a second embodiment of the present invention.

FIG. 4 is a block diagram showing a configuration of a DC-to-DC converter according to a second embodiment of the present invention. The DC-to-DC converter shown in FIG. 4 is different from the DC-to-DC converter shown in FIG. 1 in including no current detecting unit 4 and including a control unit 205 instead of the control unit 5. The control unit 205 is different from the control unit 5 in including a comparator 211 as a determination circuit instead of the comparator 11. The other components are the same as those in FIG. 1. Thus, each component also shown in FIG. 1 is identified by the same reference numeral and the detailed description thereof will be omitted herein.

Figure 5:
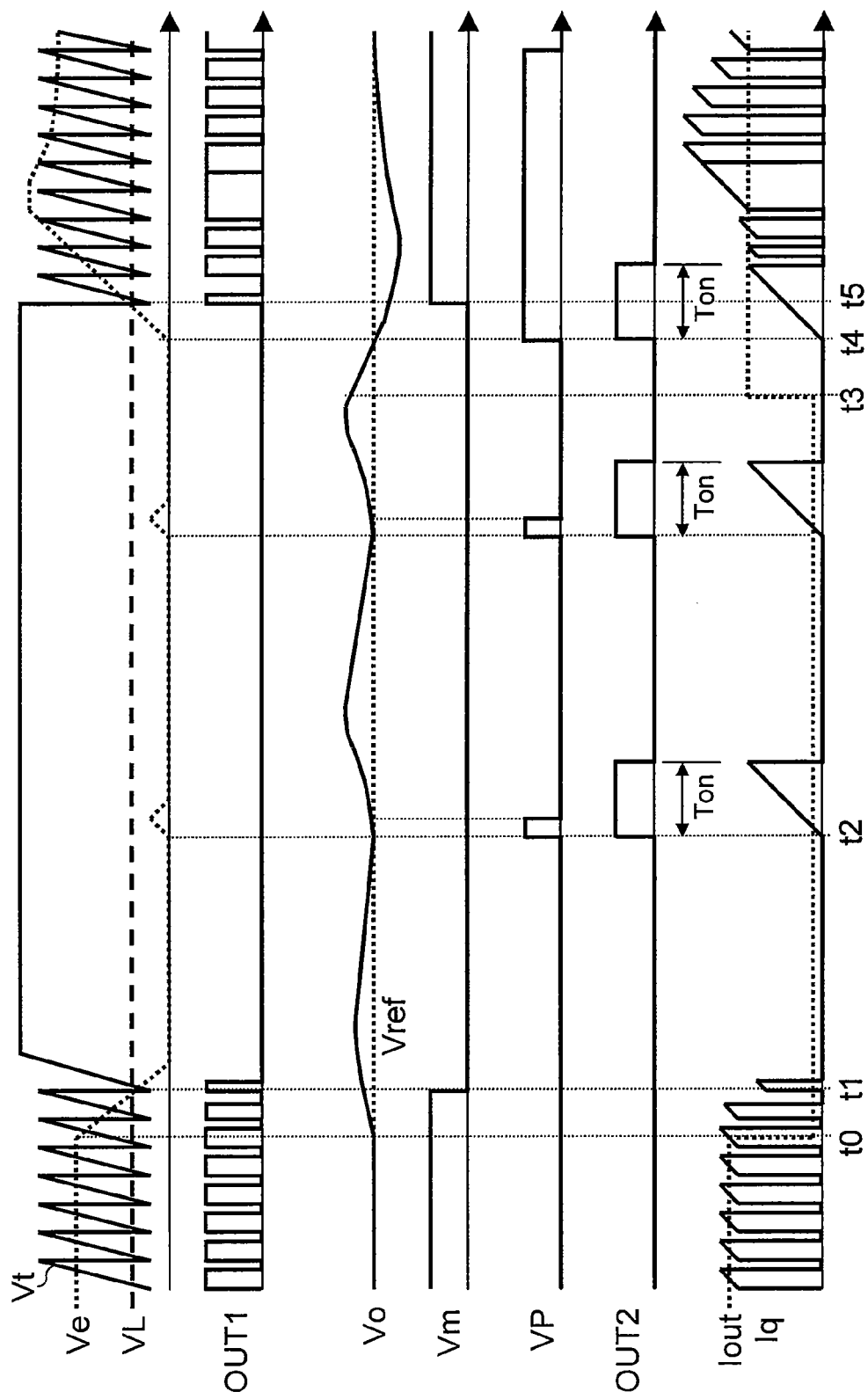
FIG. 5 is a graph showing signal waveforms in the DC-to-DC converter shown in FIG. 4.

FIG. 5 is a graph showing signal waveforms in the DC-to-DC converter shown in FIG. 4. It is now described how the DC-to-DC converter shown in FIG. 4 operates with reference to FIGS. 4 and 5.

First, at the start of operation, a voltage detection signal Vo based on an output voltage Vout is at a low level. Thus, a comparator 16 outputs "H" as an output signal VP, independently of the state of the switch circuit 15. The comparator 211 receives a threshold voltage VL sufficiently lower than the level of an error signal Ve in a stationary state in a normal operation mode. Since the error signal Ve is at a high level, the comparator 211 outputs "H" as a mode signal Vm. That is, the DC-to-DC converter shown in FIG. 4 operates in the normal operation mode.

Accordingly, a drive signal OUT1 is output as a drive signal DRS so that switching operation of a DC-to-DC conversion unit 2 increases the output voltage Vout to a desired value. Even when the voltage detection signal Vo exceeds the voltage Vr and the output signal VP from the comparator 16 changes from "H" to "L", a one-shot pulse generator 17 for detecting a rise of the output signal VP outputs no pulse so that operation in the normal operation mode continues. In this manner, operation in the normal operation mode is almost the same as that in the DC-to-DC converter shown in FIG. 1.

Next, operation of the DC-to-DC converter shown in FIG. 4 in a standby mode is described. At time t0, when a load 6 enters a standby state and an output current Iout decreases, the output voltage Vout and the voltage detection signal Vo increase. Thus, an error signal Ve output from an error amplifier 12 decreases.

At time t1, When the error signal Ve falls below the threshold voltage VL, the comparator 211 outputs "L" as the mode signal Vm. Then, the triangular wave generator 13 stops its operation and outputs "H" as a triangular wave signal Vt so that the PWM comparator 14 fixes the drive signal OUT1 at "L". At the same time, the switch circuit 15 selects the reference voltage Vref and outputs the selected voltage Vref to a positive input terminal of the comparator 16.

Since the voltage detection signal Vo is higher than the reference voltage Vref, the comparator 16 outputs "L" as the output signal VP. The DC-to-DC conversion unit 2 stops switching operation so that no power is supplied from the DC-to-DC conversion unit 2, thus causing the output voltage Vout to gradually decrease.

At time t2, when the voltage detection signal Vo falls below the reference voltage Vref, the comparator 16 raises the output signal VP from "L" to "H". Then, the one-shot pulse generator 17 receiving the output signal VP outputs a one-shot pulse with a pulse width Ton as a drive signal OUT2. A switching element 20 in the DC-to-DC conversion unit 2 is in an ON state in a period longer than in the normal operation mode. Accordingly, power supplied from the DC-to-DC conversion unit 2 to the load 6 temporarily increases, thereby increasing the output voltage Vout.

Since the voltage detection signal Vo falls below the reference voltage Vref at time t2, the error signal Ve starts to rise. However, since the comparator 16 operates more quickly than the error amplifier 12, the output voltage Vout increases so that the error signal Ve decreases to a low level again before reaching the threshold voltage VL. Accordingly, after a drop of the drive signal OUT2, the drive signal DRS is fixed at "L" and power supply from the DC-to-DC conversion unit 2 is stopped again so that the output voltage Vout decreases. This state continues until the detection signal Vo falls below the reference voltage Vref again. The foregoing operation is repeated so that the output voltage Vout is maintained in such a manner that the voltage detection signal Vo is equal to or higher than the reference voltage Vref.

Then, it is described how the DC-to-DC converter shown in FIG. 4 returns from the standby mode to the normal operation mode when the load 6 starts normal operation again and the output current Iout increases. At time t3, when the output current Iout increases, the voltage detection signal Vo starts to decrease together with the output voltage Vout. At time t4, the voltage detection signal Vo falls below the reference voltage Vref, and the one-shot pulse generator 17 outputs a pulse with a pulse width Ton. However, the output voltage Vout decreases so that the error signal Ve increases.

At time t5, when the error signal Ve exceeds the threshold voltage VL, the comparator 211 outputs "H" as the mode signal Vm. Then, the DC-to-DC converter transitions to the normal operation mode. Specifically, the triangular wave generator 13 and the PWM comparator 14 are activated and a pulse sequence is output as a drive signal OUT1 from the PWM comparator 14, and a drive signal OUT2 is fixed at "L".

As described above, in the DC-to-DC converter shown in FIG. 4, the comparator 211 performs comparison based on the level of the error signal Ve output from the error amplifier 12 so that the DC-to-DC converter transitions to the standby mode or returns to the normal operation mode. This greatly reduces the switching frequency, thereby minimizing power losses. In addition, not only prevention of burst noise but also elimination of necessity of a current detecting unit for detecting a current such as an output current is achieved.

In a switching converter such as the buck converter shown in FIG. 2, when the output current Iout has a value equal to or smaller than a given value, a current flowing in an inductor 22 is discontinuous. In such a discontinuous mode, the variation range of the ON period of the switching element 20 is generally wide in order to stabilize the output voltage Vout. In addition, the load is light in the discontinuous mode so that the level of the error signal Ve is lower than that in normal operation.

In the discontinuous mode, the output current Iout and the ON/OFF ratio (i.e., an error signal Ve) of the switching element has a relationship depending on the type of the converter, the inductance value of the inductor, the voltage level of the triangular wave signal Vt, and the switching frequency, for example. The relational expression thereof is omitted because of complexity of the expression. Accordingly, conditions of the output current Iout in transition to the standby mode are allowed to be set by adjusting the threshold voltage VL.

The threshold voltage VL or the comparator 211 may have hysteresis properties so that transition between those modes is performed with stability.

The minimum value of a period during which the switching element 20 is ON or the minimum value of the width of continuous pulses of the drive signal OUT1 may be set. In such cases, the output voltage Vout increases in a light-load state, thus easily detecting that the load is in the standby mode.

Embodiment 3

Figure 6:
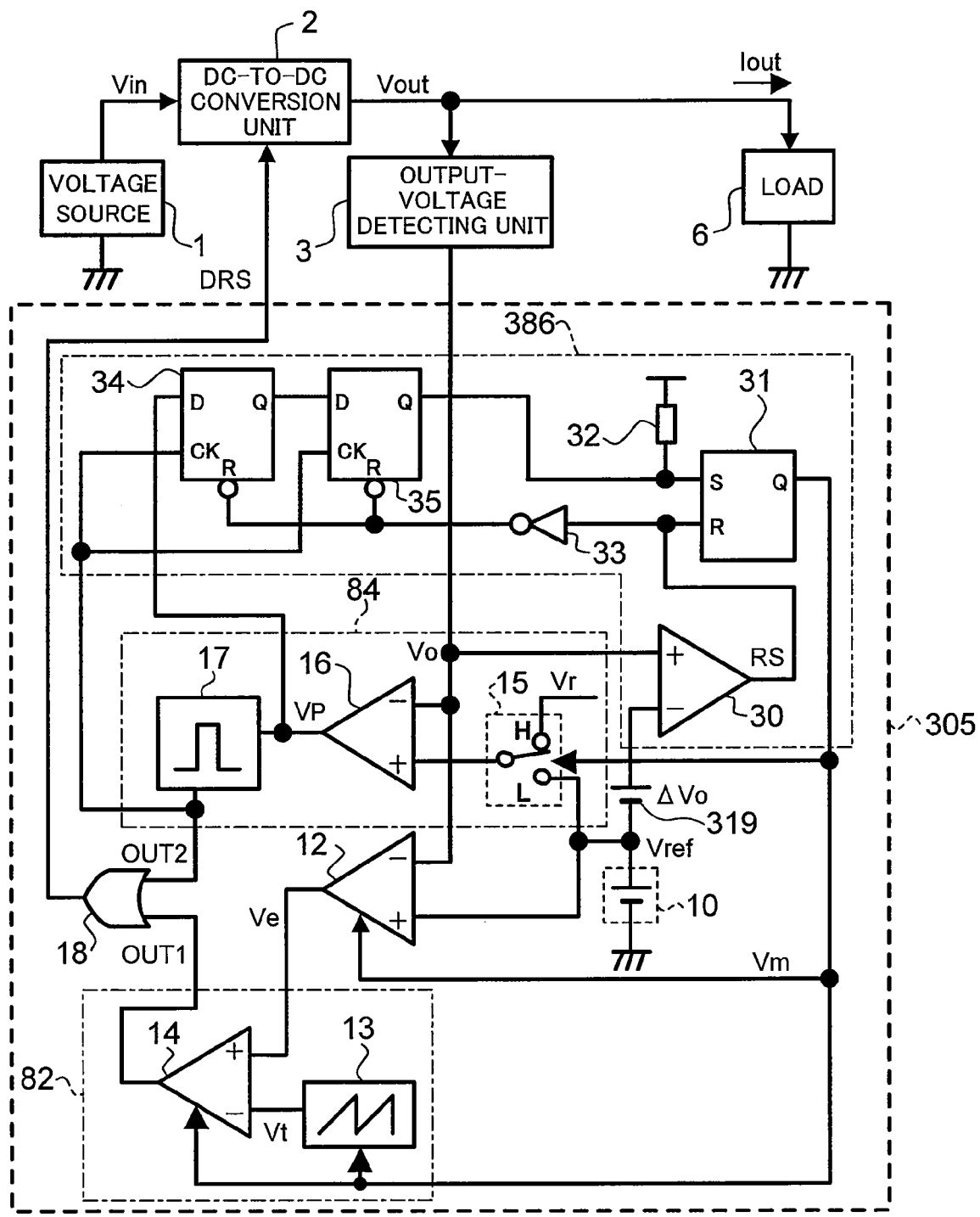
FIG. 6 is a block diagram showing a configuration of a DC-to-DC converter according to a third embodiment of the present invention.

FIG. 6 is a block diagram showing a configuration of a DC-to-DC converter according to a third embodiment of the present invention. The DC-to-DC converter shown in FIG. 6 is different from the DC-to-DC converter shown in FIG. 1 in including no current detecting unit 4 and including a control unit 305 instead of the control unit 5. The control unit 305 is different from the control unit 5 in including a determination circuit 386 instead of the comparator 11 and also including a voltage source 319. The other components are the same as those in FIG. 1. Thus, each component also shown in FIG. 1 is identified by the same reference numeral and the detailed description thereof will be omitted herein. The determination circuit 386 includes a comparator 30, an RS flip-flop 31, a resistor 32, an inverter 33, D flip-flops 34 and 35.

Figure 7:
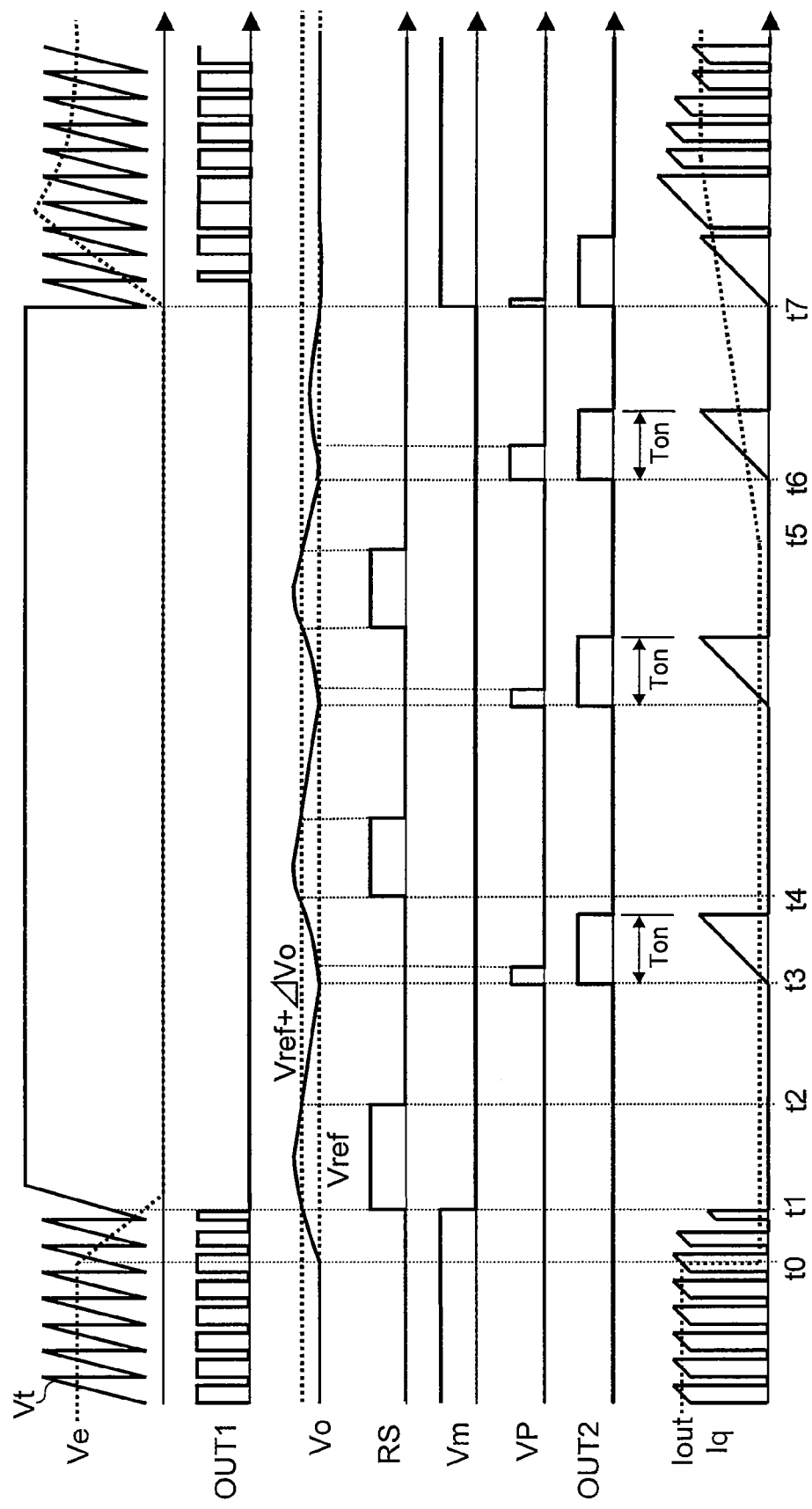
FIG. 7 is a graph showing signal waveforms in the DC-to-DC converter shown in FIG. 6.

FIG. 7 is a graph showing signal waveforms in the DC-to-DC converter shown in FIG. 6. It is now described how the DC-to-DC converter shown in FIG. 6 operates with reference to FIGS. 6 and 7.

First, at the start of operation, the RS flip-flop 31 is set to output "H" as a mode signal Vm. That is, the DC-to-DC converter shown in FIG. 6 operates in a normal operation mode.

Accordingly, a drive signal OUT1 is output as a drive signal DRS so that switching operation of a DC-to-DC conversion unit 2 increases an output voltage Vout to a desired value. Even when a voltage detection signal Vo exceeds the voltage Vr and an output signal VP from a comparator 16 changes from "H" to "L", a one-shot pulse generator 17 for detecting a rise of the output signal VP outputs no pulse. Since the states of the flip-flops 31, 34, and 35 are unchanged, operation in the normal operation mode continues. As described above, operation in the normal operation mode is almost the same as that in the DC-to-DC converter shown in FIG. 1.

Next, operation of the DC-to-DC converter shown in FIG. 6 in a standby mode is described. At time t0, when a load 6 enters a standby state and an output current Iout decreases, the output voltage Vout and the voltage detection signal Vo increase.

At time t1, the voltage detection signal Vo exceeds a threshold voltage (Vref+ΔVo) so that the output RS of the comparator 30 changes to "H". Then, the RS flip-flop 31 outputs "L" as the mode signal Vm. The output of the inverter 33 changes to "L" so that the D flip-flops 34 and 35 are reset. Since the mode signal Vm changes to "L", the error amplifier 12 stops its operation and sets an error signal Ve at a low level, and the triangular wave generator 13 stops its operation and sets a triangular wave signal Vt at "H". Accordingly, the drive signal OUT1 output from the PWM comparator 14 is fixed at "L". The switch circuit 15 selects the reference voltage Vref and outputs the selected reference voltage Vref to a positive input terminal of the comparator 16.

Since the voltage detection signal Vo is higher than the reference voltage Vref, the comparator 16 outputs "L" as the output signal VP. Then, the DC-to-DC conversion unit 2 stops switching operation so that no power is supplied from the DC-to-DC conversion unit 2, thus causing the output voltage Vout to gradually decrease.

At time t2, when the voltage detection signal Vo falls below the threshold voltage (Vref+ΔVo), the comparator 30 sets its output RS at "L". At this time, the outputs of the flip-flops 31, 34, and 35 are unchanged.

At time t3, when the voltage detection signal Vo falls below the reference voltage Vref, the comparator 16 raises the output signal VP from "L" to "H". Then, the one-shot pulse generator 17 outputs a one-shot pulse with a pulse width Ton as a drive signal OUT2. A switching element 20 in the DC-to-DC conversion unit 2 is in an ON state in a period longer than in normal operation. Accordingly, power supplied from the DC-to-DC conversion unit 2 to the load 6 temporarily increases, thereby increasing the output voltage Vout.

The D flip-flop 34 has a data input terminal D receiving the output signal VP from the comparator 16 and a clock terminal CK receiving the drive signal OUT2. The D flip-flop 34 changes its output from "L" to "H" at a rise of the drive signal OUT2.

At time t4, the voltage detection signal Vo exceeds the threshold voltage (Vref+ΔVo), and the comparator 30 sets its output RS at "H". Accordingly, the D flip-flops 34 and 35 are reset by the output of the inverter 33. Therefore, the mode signal Vm is unchanged so that the standby mode is maintained.

The DC-to-DC conversion unit 2 stops switching operation again so that no power is supplied from the DC-to-DC conversion unit 2 to reduce the output voltage Vout. The DC-to-DC conversion unit 2 stops until the voltage detection signal Vo falls below the reference voltage Vref again. The foregoing operation is repeated so that the output voltage Vout is maintained in such a manner that the voltage detection signal Vo is equal to or higher than the reference voltage Vref.

Then, operation of the DC-to-DC converter shown in FIG. 6 in returning from the standby mode to the normal operation mode is described. At time t5, when the load 6 starts normal operation, the output current Iout increases so that the output voltage Vout decreases more rapidly. Thus, a suspension period after the DC-to-DC conversion unit 2 has stopped and before the output detection signal Vo falls below the reference voltage Vref again is reduced. In addition, even when a pulse of the drive signal OUT2 is output, the output voltage Vout does not readily increase.

At time t6, when the output detection signal Vo falls below the reference voltage Vref, the drive signal OUT2 causes the output voltage Vout to increase, and the voltage detection signal Vo does not reach the threshold voltage (Vref+ΔVo). Then, the output of the D flip-flop 34 which has been previously set at "H" according to the output signal VP from the comparator 16 is not reset and is maintained.

At time t7, when the voltage detection signal Vo falls below the reference voltage Vref, the output from the D flip-flop 35 changes to "H" at a rise of the drive signal OUT2. Then, the RS flip-flop 31 is set to output "H" as the mode signal Vm. When the mode signal Vm changes to "H", the DC-to-DC converter shown in FIG. 6 transitions to the normal operation mode. Specifically, the switch circuit 15 selects the voltage Vr and outputs the selected voltage Vr to the comparator 16 so that the output signal VP from the comparator 16 changes to "L". The error amplifier 12, the triangular wave generator 13, and the PWM comparator 14 are activated and the drive signal OUT2 remains at "L", thus outputting the drive signal OUT1 as the drive signal DRS.

As described above, when the output voltage exceeds a given value in the normal operation mode, the DC-to-DC converter shown in FIG. 6 changes to the standby mode, whereas when it is detected that the output voltage does not exceed the given value in the standby mode, the DC-to-DC converter returns to the normal operation mode. That is, since the ripple of the output voltage increases as the load decreases, switching between normal operation and standby operation is performed by monitoring the ripple. In this manner, the switching frequency is greatly reduced so that power losses are minimized. In addition, not only prevention of burst noise but also elimination of necessity of a current detecting unit for detecting a current such as an output current is achieved. Thus, the error amplifier 12 is also stopped in the standby mode, resulting in reduction of power consumption.

In the DC-to-DC converter of the first through third embodiments, the buck converter shown in FIG. 2 is used as the DC-to-DC conversion unit 2. Alternatively, a converter with another configuration may be used. For example, the following buck/boost converter may be used.

Figure 8:
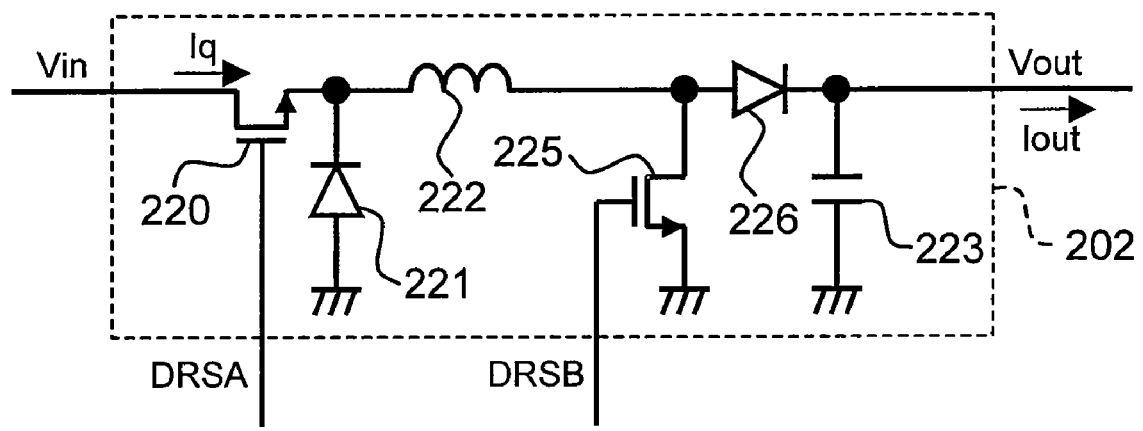
FIG. 8 is a circuit diagram showing another configuration of the DC-to-DC conversion unit shown in FIGS. 1, 4 and 6.

FIG. 8 is a circuit diagram showing another configuration of the DC-to-DC conversion unit 2 shown in FIGS. 1, 4 and 6. A DC-to-DC conversion unit 202 shown in FIG. 8 is a buck/boost converter and includes a buck switching element 220, a free-wheeling diode 221, an inductor 222, an output capacitor 223, a boost switching element 225, and an output diode 226. The buck switching element 220 and the free-wheeling diode 221 together form a buck section. The boost switching element 225 and the output diode 226 together form a boost section. In the DC-to-DC conversion unit 202, the buck section and the boost section share the inductor 222.

Switching operation of the buck switching element 220 is controlled according to a drive signal DRSA to apply an input voltage Vin to an end of the inductor 222. Switching operation of the boost switching element 225 is controlled according to a drive signal DRSB to apply a ground potential to the other end of the inductor 222. Input/output characteristics of such a buck/boost converter are expressed as:

$$V_{out} = V_{in} \times \delta1/(1-\delta2)$$

where the ratio (duty ratio) of an ON period of the buck switching element 220 to one switching cycle is δ1 and the duty ratio of the boost switching element 225 is δ2.

In normal operation, the drive signal DRSA for controlling ON/OFF states of the buck switching element 220 and the drive signal DRSB for controlling ON/OFF states of the boost switching element 225 are generally output from different PWM comparators. To achieve this configuration, the triangular wave generator 13 generates two triangular wave signals having the same phase at different voltage levels and an additional set of the PWM comparator 14 and the OR circuit 18 is used so that outputs from the two OR circuits 18 are used as drive signals DRSA and DRSB, respectively, for example. In the standby mode, the drive signals OUT2 are output as the drive signals DRSA and DRSB, respectively, through the two OR circuits 18.

As described above, the embodiments of the present invention can minimize power losses in a DC-to-DC converter, and thus may be useful for, for example, a DC-to-DC converter for supplying a DC voltage to various types of electronic equipment.

What is claimed is:

1. A DC-to-DC converter, comprising:
    a DC-to-DC conversion unit having an inductor and a switching element connected to the inductor, the DC-to-DC conversion unit being configured to convert an input voltage into an output voltage by switching operation of the switching element and to supply the output voltage to a load; and
    a control unit,
    wherein the control unit includes:
        a determination circuit for determining whether the load is in a normal operation state or a standby state based on one of a current flowing in the DC-to-DC converter and the output voltage and for generating a mode signal indicating a result of the determination;
        an error amplifier for generating an error signal according to an error between a voltage corresponding to the output voltage and a reference voltage;
        a first drive-signal generator for generating a pulse sequence of pulses each having a pulse width corresponding to the error signal and outputting the pulse sequence as a first drive signal when the mode signal indicates that the load is in the normal operation state; and
        a second drive-signal generator for generating a pulse having a pulse width larger than a cycle of repetition of the pulses in the pulse sequence and outputting the generated pulse as a second drive signal when the voltage corresponding to the output voltage falls below the reference voltage in a situation where the mode signal indicates that the load is in the standby state, and
    wherein the DC-to-DC conversion unit converts the input signal into the output voltage according to a logical sum of the first drive signal and the second drive signal.

2. The DC-to-DC converter of claim 1, further including a current detecting unit for detecting one of a current supplied to the load and a current flowing in an element constituting the DC-to-DC conversion unit,
    wherein the determination circuit performs the determination based on a detection result of the current detecting unit.

3. The DC-to-DC converter of claim 1, wherein the determination circuit performs the determination based on the error signal.

4. The DC-to-DC converter of claim 1, wherein the determination circuit includes a comparator for comparing the voltage corresponding to the output voltage with a given voltage higher than the reference voltage, and
    the mode signal indicates that the load is in the standby state when the voltage corresponding to the output voltage exceeds the given voltage.

5. The DC-to-DC converter of claim 1, wherein the first drive-signal generator stops operation of at least a part of circuitry constituting the first drive-signal generator when the mode signal indicates that the load is in the standby state.

6. The DC-to-DC converter of claim 1, wherein the DC-to-DC conversion unit includes, as the switching element, a buck switching element for supplying the input voltage to an end of the inductor and a boost switching element for supplying a ground potential to another end of the inductor, and
    each of the buck switching element and the boost switching element is switch-controlled according to the drive signal generated by the second drive-signal generator when the mode signal indicates the load is in the standby state.

* * * * *